(12) United States Patent
Sun

(10) Patent No.: US 12,703,523 B2
(45) Date of Patent: Aug. 11, 2026

(54) UNMANNED AERIAL VEHICLE INCLUDING SECONDARY FLIGHT CONTROLS FOR SPEED-INDEPENDENT ATTITUDE CONTROL AND AXIS-INDEPENDENT LINEAR MOTION

(71) Applicant: DDD Express, San Jose, CA (US)

(72) Inventor: Jerry Lu Chen Sun, San Jose, CA (US)

(73) Assignee: DDD EXPRESS, San Jose, CA (US)

( * ) Notice: Subject to any disclaimer, the term of this patent is extended or adjusted under 35 U.S.C. 154(b) by 0 days.

(21) Appl. No.: 18/785,204

(22) Filed: Jul. 26, 2024

(65) Prior Publication Data

US 2026/0028141 A1 Jan. 29, 2026

(51) Int. Cl.

| | |
|---|---|
| ***B64U 40/10*** | (2023.01) |
| ***B64C 15/14*** | (2006.01) |
| ***B64U 10/14*** | (2023.01) |
| ***B64U 10/25*** | (2023.01) |
| ***B64U 50/18*** | (2023.01) |

(52) U.S. Cl.

CPC .............. *B64U 40/10* (2023.01); *B64C 15/14* (2013.01); *B64U 10/14* (2023.01); *B64U 10/25* (2023.01); *B64U 50/18* (2023.01)

(58) Field of Classification Search

CPC ........ B64U 50/18; B64U 10/20; B64U 10/25; B64C 15/00; B64C 15/14; B64C 29/02; F42B 10/663

See application file for complete search history.

(56) References Cited

U.S. PATENT DOCUMENTS

| | | | | |
|---|---|---|---|---|
| 4,896,846 | A * | 1/1990 | Strom | B64C 15/14 244/75.1 |
| 8,152,109 | B2 * | 4/2012 | Silich | B64C 15/14 244/199.4 |
| 12,024,280 | B2 * | 7/2024 | Warsop | B64C 15/14 |
| 12,134,102 | B2 * | 11/2024 | Moon | B64D 37/00 |
| 12,145,717 | B2 * | 11/2024 | Warsop | B64U 40/20 |
| 12,151,810 | B2 * | 11/2024 | Zhao | B64C 25/16 |
| 2010/0044501 | A1 * | 2/2010 | Silich | B64C 15/14 244/52 |
| 2022/0097849 | A1 * | 3/2022 | Zhao | B64C 5/02 |
| 2022/0258852 | A1 * | 8/2022 | Moon | B64C 15/14 |
| 2024/0124168 | A1 * | 4/2024 | Guillouet | B64U 30/20 |

FOREIGN PATENT DOCUMENTS

| | | | | |
|---|---|---|---|---|
| GB | 2265342 | A * | 9/1993 | F42B 15/01 |

* cited by examiner

*Primary Examiner* — Philip J Bonzell
(74) *Attorney, Agent, or Firm* — Sterne, Kessler, Goldstein & Fox P.L.L.C.

(57) ABSTRACT

An unmanned aerial vehicle (UAV) and method of operating the same is disclosed. The UAV includes an airframe, a set of primary flight controls connected to the airframe, and a set of secondary flight controls that comprises one or more thrusters connected to the airframe. The set of primary flight controls is operable to control an attitude and linear motion of the UAV in three spatial dimensions while the UAV is in flight. The set of secondary flight control is operable to control the attitude of the UAV in one or more of the three spatial dimensions in a speed-independent manner while the UAV is in flight. The airframe houses a flight controller that is configured to operate the set of primary flight controls and the set of secondary flight controls.

20 Claims, 7 Drawing Sheets

UNMANNED AERIAL VEHICLE INCLUDING SECONDARY FLIGHT CONTROLS FOR SPEED-INDEPENDENT ATTITUDE CONTROL AND AXIS-INDEPENDENT LINEAR MOTION

BACKGROUND

Field

The present disclosure is generally directed to unmanned aerial vehicles.

Background

Since the inception of the airplane more than a hundred years ago, flight control of airplanes has relied mostly on aerodynamic forces created from their various control surfaces, such as ailerons, flaps, elevators, rudders, canards, etc. Such forces are governed by the physical laws of aerodynamics and are a function of airplane velocity and attitude. This is true for both the magnitude and the direction of such control forces. Consequently, dynamics, stability and maneuverability of airplanes are limited by such aerodynamic forces. There are exceptions to this where the direct propulsion thrust from jet engines are vectored or where, e.g., in rotorcraft, lift forces are tilted to provide flight control. However, flight control via propulsion thrust vector carries its own limitations as it obligatorily ties flight control performance to the aircraft's direction and speed of travel, i.e., an attribute of propulsion thrust.

SUMMARY

An unmanned aerial vehicle (UAV) is disclosed herein that comprises an airframe, a set of primary flight controls connected to the airframe, and a set of secondary flight controls connected to the airframe. The set of primary flight controls is operable to control an attitude and linear motion of the UAV in three spatial dimensions while the UAV is in flight. The set of secondary flight controls comprises one or more thrusters connected to the airframe and is operable to control the attitude of the UAV in one or more of the three spatial dimensions in a speed-independent manner while the UAV is in flight. The airframe houses a flight controller that is connected to and configured to operate the set of primary flight controls and the set of secondary flight controls.

In one implementation of the UAV, the set of secondary flight controls is further operable to control linear motion of the UAV in one or more of the three spatial dimensions in an axis-independent manner while the UAV is in flight.

In another implementation of the UAV, the UAV is a missile and the set of primary flight controls comprises one or more of canards, tail flaps, or a tail thrust.

In yet another implementation of the UAV, the UAV is a fixed wing aircraft and the set of primary flight controls comprises one or more of canards, ailerons, an elevator, or a rudder.

In still another implementation of the UAV, the UAV is a rotorcraft and the set of primary flight controls comprises one or more rotors.

In a further implementation of the UAV, the UAV is a compound aircraft and the set of primary flight controls comprises a combination of fixed wing aircraft flight controls and rotorcraft flight controls.

In a still further implementation of the UAV, the airframe further houses a source of thrust for the one or more thrusters, the source of thrust comprising one or more of an on-board air compressor, a high pressure gas reservoir, a chemical combustion engine, or bleed from a propulsion thrust.

In a yet further implementation of the UAV, each of the one or more thrusters comprises a fixed thruster.

In another implementation of the UAV, at least one thruster of the one or more thrusters is a rotatable thruster.

A method performed by a flight controller of a UAV is also disclosed herein, wherein the UAV comprises an airframe, a set of primary flight controls connected to the airframe, and a set of secondary flight controls that comprises one or more thrusters connected to the airframe, and wherein the flight controller is housed in the airframe and is connected to the set of primary flight controls and the set of secondary flight controls. The method comprises operating the set of primary flight controls to control an attitude and linear motion of the UAV in three spatial dimensions while the UAV is in flight, and operating the set of secondary flight controls to control the attitude of the UAV in one or more of the three spatial dimensions in a speed-independent manner while the UAV is in flight.

In one implementation of the foregoing method, the method further comprises operating the set of secondary flight controls to control linear motion of the UAV in one or more of the three spatial dimensions in an axis-independent manner while the UAV is in flight.

In another implementation of the foregoing method, the UAV is a missile and the set of primary flight controls comprises one or more of canards, tail flaps, or a tail thrust.

In yet another implementation of the foregoing method, the UAV is a fixed wing aircraft and the set of primary flight controls comprises one or more of canards, ailerons, an elevator, or a rudder.

In still another implementation of the foregoing method, the UAV is a rotorcraft and the set of primary flight controls comprises one or more rotors.

In a further implementation of the foregoing method, the UAV is a compound aircraft and the set of primary flight controls comprises a combination of fixed wing aircraft flight controls and rotorcraft flight controls.

In a still further implementation of the foregoing method, the airframe further houses a source of thrust for the one or more thrusters, the source of thrust comprising one or more of an on-board air compressor, a high pressure gas reservoir, a chemical combustion engine, or bleed from a propulsion thrust.

In a yet further implementation of the foregoing method, each of the one or more thrusters comprises a fixed thruster.

In another implementation of the foregoing method, at least one thruster of the one or more thrusters is a rotatable thruster.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

I. Introduction

Figure 1:
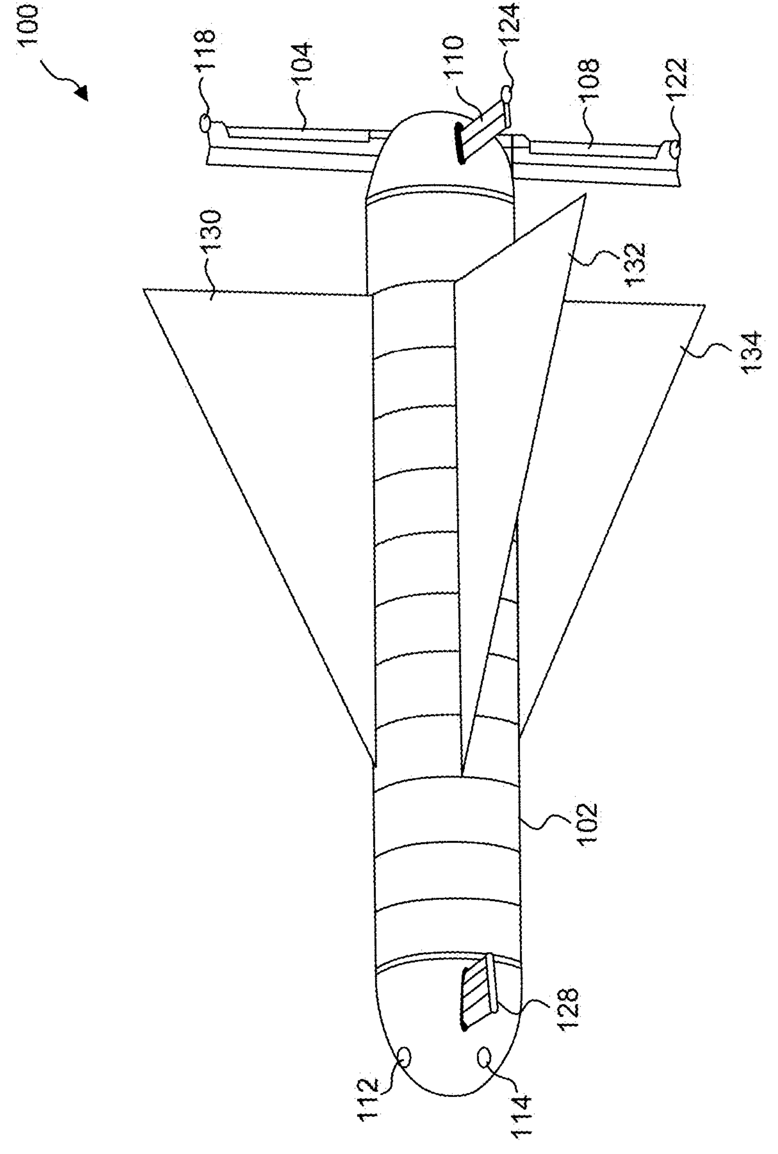
FIG. 1 is a side view of a fixed-wing missile-like UAV that includes three nose thrusters and four tail thrusters for enhanced linear motion and attitude control performance during flight in accordance with an example embodiment.

As discussed above in the Background Section, since the inception of the airplane more than a hundred years ago, flight control of airplanes has relied mostly on aerodynamic forces created from their various control surfaces, such as ailerons, flaps, elevators, rudders, canards, etc. Such forces are governed by the physical laws of aerodynamics and are a function of airplane velocity and attitude. This is true for both the magnitude and the direction of such control forces. Consequently, dynamics, stability and maneuverability of airplanes are limited by such aerodynamic forces. There are exceptions to this where the direct propulsion thrust from jet engines are vectored or where, e.g., in rotorcraft, lift forces are tilted to provide flight control. However, flight control via propulsion thrust vector carries its own limitations as it obligatorily ties flight control performance to the aircraft's direction of travel, i.e., an attribute of propulsion thrust.

In view of the foregoing, unmanned aerial vehicles (UAVs) are described herein that include new and innovative means for generating flight control forces that are independent from aircraft velocities or propulsion thrusts. Accordingly, such UAV designs can offer a new dimension of benefit in aircraft flight control.

As will be discussed herein in reference to at least one embodiment of a UAV, by releasing propulsion-independent thrust from strategically located thrusters on the UAV, the UAV's flight controller can use the reaction forces generated by such thrust to control the UAV's velocity, position and attitude in a manner that is independent from the UAV's velocity (i.e. the speed and direction of the UAV) or the UAV's lift (as in rotorcraft). Such flight attitude control effectiveness can be achieved at all speeds through all phases of flight, i.e., providing application coverage throughout the UAV's flight envelope. Thus, these thrusts can greatly expand the maneuverability of the UAV in flight beyond what can be achieved with existing flight control means.

It is recognized that the use of thrust for flight control has been employed in a limited fashion in certain manned aircraft. One example of this is the Harrier aircraft, which includes thruster jets embedded at the wing tips to assist with stability during landing only. Another example is the F-35B fighter jet with its vectoring main engine and vertical lift fan. For helicopters, one such example is the NOTAR helicopter, in which a thruster jet serves as a replacement for a tail rotor in achieving helicopter yaw stability. However, the embodiments described herein differ from these aircraft in at least the following aspects: (i) the embodiments are UAVs; and (ii) the embodiments include both a set of primary flight controls (e.g., fixed aircraft flight controls, rotorcraft flight controls, or a combination thereof) that is operable to control the attitude and linear motion of the UAV in three spatial dimensions through all phases of flight, as well as a set of secondary flight controls that is non-overlapping with respect to the set of primary flight controls and that comprises one or more thrusters that are capable of controlling at least the attitude of the UAV in one or more of three spatial dimensions in a speed-independent manner (i.e., at all aircraft speeds) through all phases of flight. In certain embodiments, the set of secondary flight controls is further operable to control linear motion of the UAV in one or more of the three spatial dimensions in an axis-independent manner. Axis-independent linear motion is a linear translational movement that is one-dimensional in nature, uncoupled from the other two dimensions in 3-dimensional space and independent of the UAV's original direction of motion.

II. Discussion of Example UAV Embodiments

Conventional aircraft flight controls are based either on aerodynamic control surfaces (for fixed wing aircraft) or tilting of thrusts (for rotorcraft).

Aerodynamic control surfaces are typically applied for fixed-wing aircraft. Such aerodynamic control surfaces include, typically, ailerons for roll attitude control, elevators for pitch attitude control, and rudders for yaw attitude control. Control forces and moments generated from such aerodynamic control surfaces are proportional to the square of their relative airspeeds and are ineffective at low speeds. This poses a problem for aircraft flight control at low speeds including take-off and landing of VTOL (vertical takeoff and landing) aircraft. No independent attitude control is available.

For rotorcraft such as helicopters and quadcopters, attitude control is achieved mainly by tilting of their main thrust forces. This is the same force that is providing both aircraft lift and enabling aircraft travel. This normally offers good maneuverability at low speeds, when there exists sufficient lift. At marginal hover conditions, tilting of the lift thrust will result in altitude loss and coupled motion in the aircraft's attitude. Furthermore, thrust vector control authority and its effectiveness diminish as aircraft speed increases.

In accordance with the UAV embodiments disclosed herein, a secondary or complementary set of flight controls in the form of one or more thrusters are installed on the aircraft and these thrusters can operate independently of the UAV's propulsion forces for the purpose of aircraft flight control. As will be made evident by the following disclosure, such thruster(s) may provide flight control of a UAV at any speed throughput all phases of a flight, i.e., throughout the UAV's full flight envelope, from takeoff to landing.

The following paragraphs provide details concerning specific design parameters and considerations of such flight control thrusters.

Location of Thrusters. The purpose of the thrusters is to provide aircraft fight control. Therefore, their technical purpose is to provide control forces at the UAV's center of gravity and/or rotational moments to the UAV. Thus, the effectiveness of the thrusters depends on their orthogonal distance to the aircraft center of gravity. For example, for a standard fixed-wing configuration, the best location of a thruster for pitch control will be at the nose or tail of the airframe, as these locations are furthest away from the UAV's center of gravity which is close to its wings.

Thus, the location of such flight-control thrusters is an important design consideration in its application. As will be readily appreciated by persons skilled in the relevant art(s), the selection of locations of for the flight-control thrusters will be aircraft-configuration specific. The arrangement should be designed specifically for a particular aircraft configuration to achieve a unique set of desired flight control objectives. For example, different thruster locations may be selected to achieve different flight control goals, e.g., one for agile turns and one for precision positioning, even for the same UAV.

Direction of Thrust. Direction of thrust is another important design parameter. Thrust can be used to create rotational aircraft moments around the axis that is co-planar orthonormal with respect to the aircraft center of gravity. Thus, using an example of a conventional fixed-wing aircraft during cruise, a flight-control thrust directly downward toward the earth will create a pure pitching moment of the aircraft. By orienting this thrust vector 45 degrees around the aircraft longitudinal axis, this same thrust will create both pitch and yaw moment of the aircraft.

The direction of the thrusters is an important design parameter of its application. As will be readily appreciated by persons skilled in the relevant art(s), this design parameter should be designed specifically for a particular aircraft configuration to achieve a unique set of desired flight control objectives.

Sources of Thrust. The onboard flight-control thrusts can be generated via various means. For example, thrusts can be generated from an on-board air compressor or a chemical combustion engine. Thrusts can also be extracted from an onboard high-pressure reservoir that is either charged during flight or pre-charged before flight. Still further, thrusts may be generated using a bleed from a primary propulsion thrust of the UAV. A combination of any of the foregoing means may also be used.

Note that magnitude of the thrust can either stay constant or variable, depending on the thruster control valves of specific thrusters adopted.

The source of thrust is an important design parameter of its application. As will be readily appreciated by persons skilled in the relevant art(s), this design parameter should be designed specifically for a particular aircraft configuration to achieve a unique set of desired flight control objectives.

Integration of Thrusts into UAV Flight Control. Using independent thrusts for aircraft flight control seems to be an effective approach conceptually. However, such thrusts invariably will interact with existing aircraft flight control mechanisms, be it elevators, ailerons, rotors, etc. Improper introduction of attitude control thrust can create an undesired and unpredictable impact on an existing aircraft flight control and even result in aircraft instability or loss of control.

It is important to observe that the proposed thrusters are a flight control mechanism in additional to the aircraft's existing (primary) flight control mechanisms. From the aircraft control perspective, the introduction of thrusters creates a multi-input, multi-output (MIMO) system. That is, there are now multiple sets of mechanisms (thrusters plus original mechanisms) to control aircraft motion in 3-D space, around each aircraft axis, (therefore, multiple-input) and some thrusters may control multiple axes of aircraft motion simultaneously (e.g. when a thruster is not aligned singularly to a specific axis of aircraft motion), (therefore, multiple-output). There exist several methodologies in design of MIMO aircraft attitude control systems. For example, one can break down a MIMO system into a collection of SISO (single-input, single-output) subsystems and apply SISO control design methodologies successively. There is also the Optimal Control methodology specifically developed for MIMO control system design.

Recognizing the MIMO nature of an aircraft equipped with a thruster flight control system is an important design consideration. As will be readily understood by persons skilled in the relevant art(s), judicious selection and application of an appropriate flight control methodology to successfully integrate thrusters with conventional control mechanisms should be exercised specifically for a particular aircraft configuration to achieve a desired effectiveness in attitude control.

Three example UAV embodiments will now be described to illustrate design methods of flight control thrusters applications, one for a fixed wing UAV, one for rotorcraft UAV, and one for a compound UAV that contains both fixed-wing and rotorcraft characteristics.

Example 1: Application of Flight Control Thrusters to a Fixed-Wing UAV

Figure 2:
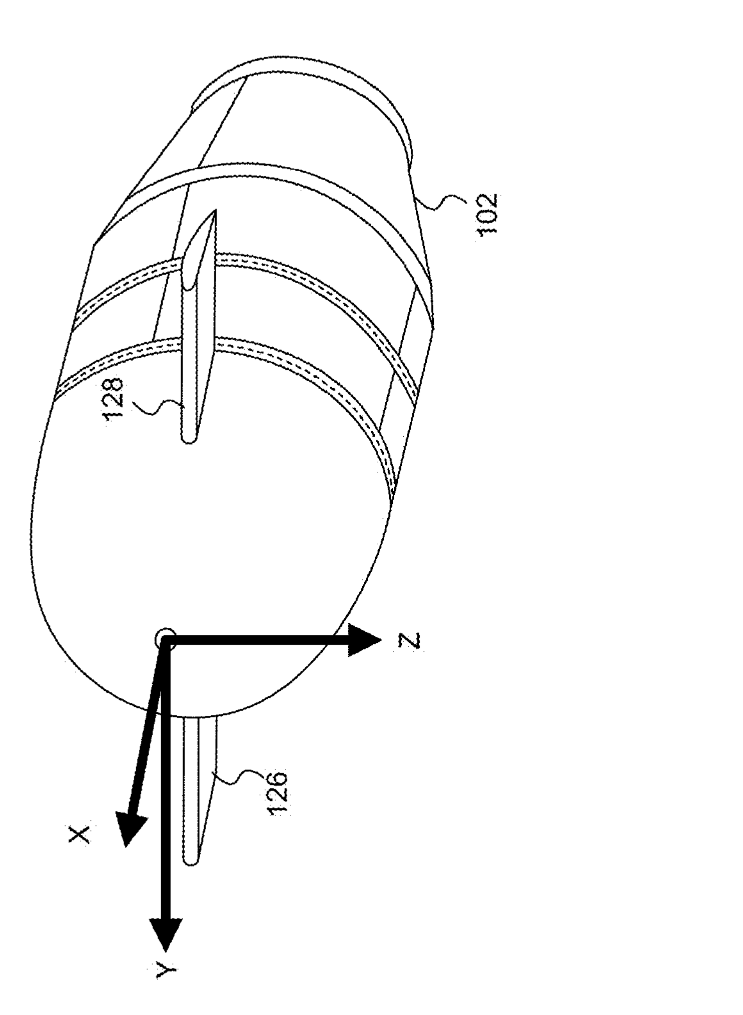
FIG. 2 is a perspective view of the nose of the fixed-wing missile-like UAV of FIG. 1.
Figure 3:
FIG. 3 is a view of the nose thrusters of the fixed-wing missile-like UAV of FIG. 1.
Figure 3:
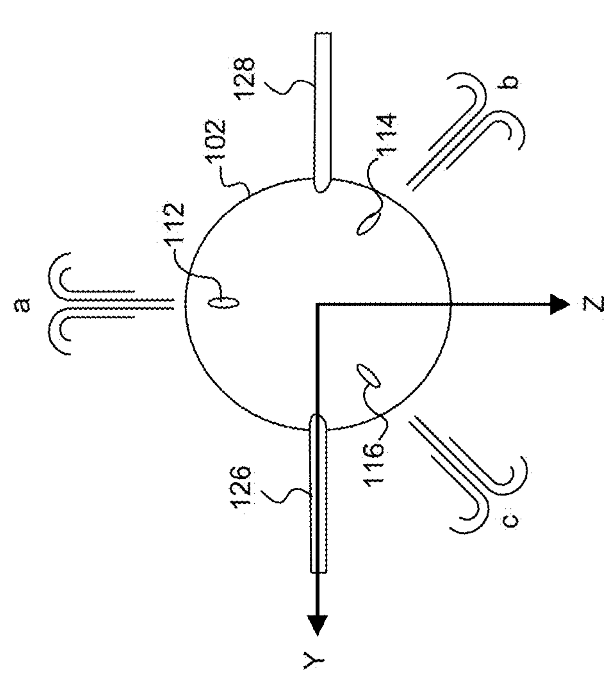
Figure 4:
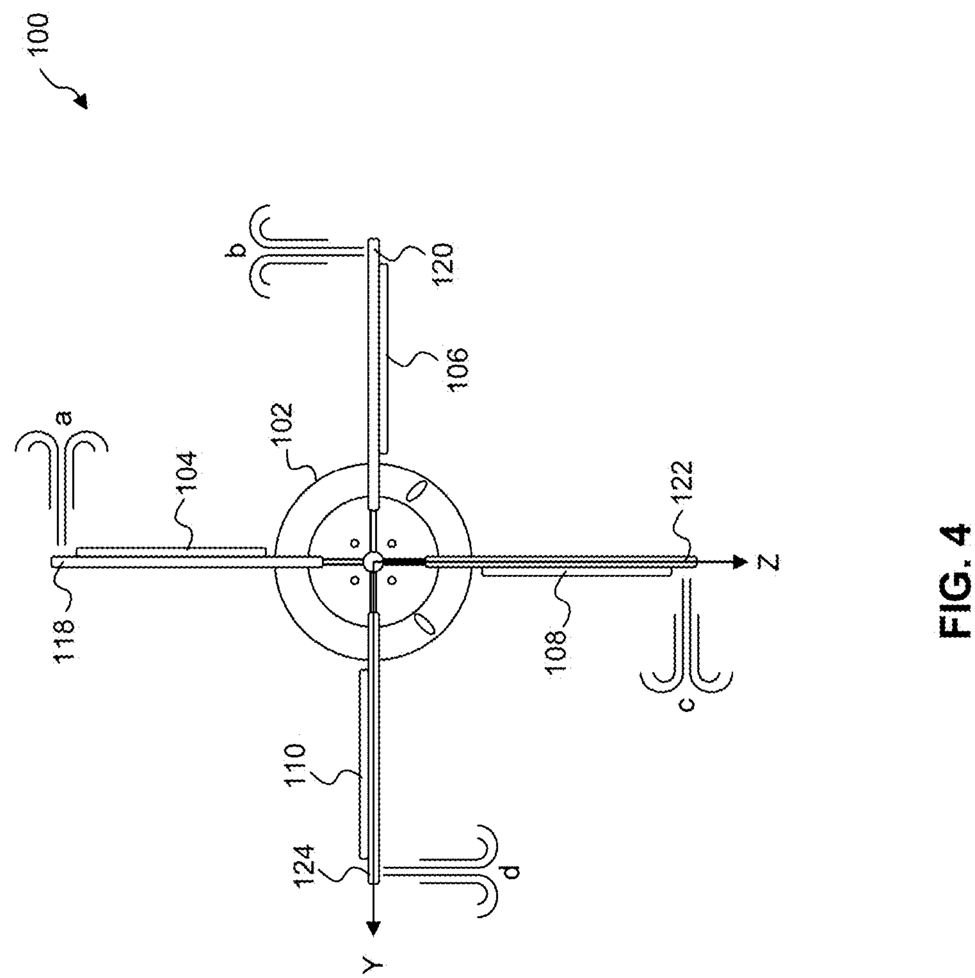
FIG. 4 is a view of the tail thrusters of the fixed-wing missile-like UAV of FIG. 1

FIGS. 1-4 collectively depict an example of a fixed-wing missile-like UAV 100 that includes three nose thrusters and four tail thrusters for enhanced linear motion and attitude control performance during flight. In particular, FIG. 1 provides a side view of UAV 100, FIG. 2 provides a perspective view of a nose of UAV 100, FIG. 3 provides a view of the nose thrusters of UAV 100, and FIG. 4 provides a view of the tail thrusters of UAV 100. For discussion purposes, a reference coordinate (X, Y, Z) frame is overlaid on FIGS. 2-4.

As shown in FIGS. 1-4, UAV 100 comprises an airframe 102 to which are attached four pivotable tail fins 104, 106, 108 and 110, and two sets of thrusters-a first set of three thrusters 112, 114, and 116 located on the nose portion of airframe 102, and a second set of four thrusters 118, 120, 122 and 124 located on the four tail fins, respectively. UAV 100 also comprises two fixed canards 126 and 128 attached to the nose portion of airframe 102 and four fixed wings 130, 132, 134 and 136 attached to a cylindrical body portion of airframe 102 (wing 136 is not visible in FIGS. 1-4).

The set of three nose thrusters 112, 114 and 116 are oriented 120-degrees apart evenly around the circumference of the nose of UAV 100. Their locations and thrust directions are illustrated in FIG. 3. In FIG. 3, the jets generated by nose thrusters 112, 114 and 116 are labeled a, b, and c, respectively.

This set of three nose thrusters 112, 114 and 116 provides direct off-center-of-gravity control forces in Y and Z axes, consequently, providing direct pitch and yaw UAV control. The minimum number of jet ports to accomplish this is three, as illustrated in FIG. 3. Representative jet port positions and respective jet directions are shown in FIG. 3. With the reference frame illustrated in FIG. 3, the combination of jet a, b, and c can produce net forces in the Y and Z direction, resulting in pitch and yaw control moments of UAV 100. In order to achieve pure rotating moments, the magnitude of thrust forces from these thrusters should be modulated to not be the same.

Table 1 below lists the nose jet combinations for such forces and moments. As noted above, to achieve pure rotating moments, the magnitude of thrust forces from these thrusters should be modulated to not be the same

TABLE 1

| Nose Jet Combinations for Forces and Moments | | |
|---|---|---|
| Net Force | Net Moment | Jet combinations (qualitative only) |
| +Y | Positive Yaw moment | a + c |
| −Y | Negative Yaw moment | a + b |
| +Z | Negative Pitch moment | b + c |
| −Z | Positive Pitch moment | a |

The second set of four tail thrusters 118, 120, 122 and 124 are located at the end of each tail fin. Their locations and thrust directions are illustrated in FIG. 4. In FIG. 4, the jets generated by tail thrusters 118, 120, 122 and 124 are labeled a, b, c, and d, respectively.

Through different combinations, jets from these four ports 118, 120, 122 and 124 can produce net off-center-of-gravity control forces in the Y and Z axes, and consequently, pitch and yaw UAV control. Jets from these four ports 118, 120, 122 and 124 can also produce direct positive or negative UAV roll controls. With the reference frame illustrated in FIG. 4, the combination of jets a, b, c, and d can produce net forces in the Y and Z direction, as well as net moment around the X-axis, resulting in pitch and yaw control moments of the UAV as well as net roll moments. The table below lists the tail jet combinations for such forces and moments.

TABLE 2

| Tail Jet Combinations for Forces and Moments | | |
|---|---|---|
| Net Force | Net Moment | Jet combinations (qualitative only) |
| +Y | Positive Yaw moment | c + (b + d) |
| −Y | Negative Yaw moment | a + (b + d) |
| +Z | Negative Pitch moment | d + (a + c) |
| −Z | Positive Pitch moment | b + (a + c) |
| null | Positive Roll moment | b + d |
| null | Negative Roll moment | a + c |

Individually, the nose-set of jets 112, 114 and 116 and the tail-set of jets 118, 120, 122 and 124 can each produce off-center-of-gravity forces in the Y-axis and Z-axis. These off-center-of-gravity forces produce body-rotating moments for UAV 100. Collectively, the combination of nose and tail jets can produce net Y-axis and Z-axis side forces on UAV 100 center of gravity. Such center-of-gravity centered side forces cause direct lateral movements of UAV 100 without body rotation. These types of pure side forces are independent from vehicle velocities throughout all phases of flight of UAV 100.

In view of the fixed wings and pivotable tail fins for this example embodiment, UAV 100 has a total of eleven attitude control devices made up of four tail fins 104, 106, 108 and 110, three nose thrusters 112, 114 and 116, and four tail thrusters 118, 120, 122 and 124. For clarity of illustration, instead of an integrated design approach where linear and rotational motions are considered together, sample flight control design of UAV 100 is partitioned into two separate formulations: linear motion control and attitude control.

Linear Motion Control for Example UAV 100.

In this sample design, the flight control thrusters do not produce any control force in the direction of travel, i.e., the X-axis. All forces produced are for lateral motion of UAV 100, i.e., in Y-axis and Z-axis. Pure linear control forces (i.e., forces that do not generate rotational moments to an aircraft) in the Y-Z axis plane can be generated by judicial simultaneous application of these flight control thrusters.

Thus, for lateral motion control, the open-loop dynamic characteristic can be described as follows.

$$x = [Y, Z, v_y, v_z]',$$

where x are system dynamic states, $$u = [\mathrm{Fin}_1, \mathrm{Fin}_2, \mathrm{Fin}_3, \mathrm{Fin}_4, \mathrm{Nose}_1, \mathrm{Nose}_2, \mathrm{Nose}_3, \mathrm{Tail}_a, \mathrm{Tail}_b, \mathrm{Tail}_c, \mathrm{Tail}_d]',$$

where u is the control distribution matrix, $$\dot{x} = A \cdot x + B \cdot u$$

$$A = \begin{bmatrix} 0 & 0 & 0 & 0 \\ 0 & 0 & 0 & 0 \\ 0 & 0 & 1 & 0 \\ 0 & 0 & 0 & 1 \end{bmatrix},$$

$$B = \begin{bmatrix} 0 & 0 & 0 & 0 & | & 0 & 0 & 0 & 0 & 0 & 0 & 0 \\ 0 & 0 & 0 & 0 & | & 0 & 0 & 0 & 0 & 0 & 0 & 0 \\ - & - & - & - & - & - & - & - & - & - & - & - \\ b11 & b12 & b13 & b14 & | & 0 & + & - & + & 0 & - & 0 \\ b21 & b22 & b23 & b23 & | & + & - & - & 0 & + & 0 & - \end{bmatrix}$$

where in B $$\begin{bmatrix} b11 & b12 & b13 & b14 \\ b21 & b22 & b23 & b24 \end{bmatrix}$$

is the airplane's original open-loop control matrix, "+" means a positive contribution of undetermined value (specific values are functions of aircraft dimensions and strength of flight control thrusts), and "–" means a negative contribution of undetermined value (specific values are functions of aircraft dimensions and strength of flight control thrusts).

As will be readily appreciated by persons skilled in the relevant art(s), closed-loop flight control can be designed based on the above set of equations using various flight control methodologies including classical control, optimal control, non-linear control, on-off control, etc.

Attitude Control for Example UAV 100.

The eleven flight controls of example UAV 100 (tail fins 104, 106, 108 and 110, nose thrusters 112, 114 and 116, and tail thrusters 118, 120, 122 and 124) can be used in combination to control three aircraft attitudes: roll, pitch and yaw. Therefore, for flight control design, this is an eleven-input, three-output system, a truly MIMO system. The attitude control system of example UAV 100 can be expressed in state-space form as follows. These set of equations forms the foundation of flight control design of this illustrative MIMO control system. As will be readily appreciated by persons skilled in the relevant art(s), the flight control system can be designed using classical control techniques or, more effectively, an optimal control methodology.

Thus, for attitude control formulation, the open-loop dynamic characteristic can be described as follows.

$$x = [\phi, \theta, \psi, p, q, r]',$$

where x are system dynamic states, $$u = [\mathrm{Fin}_1, \mathrm{Fin}_2, \mathrm{Fin}_3, \mathrm{Fin}_4, \mathrm{Nose}_1, \mathrm{Nose}_2, \mathrm{Nose}_3, \mathrm{Tail}_a, \mathrm{Tail}_b, \mathrm{Tail}_c, \mathrm{Tail}_d]',$$

where u is the control distribution matrix, $$\dot{x} = A \cdot x + B \cdot u$$

$$A = \begin{bmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix},$$

$$B = \left[\begin{array}{cccc|ccccccc} 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ 0 & 0 & 0 & 0 & 0 & 0 & 0 & 0 & 0 & 0 & 0 \\ \hline b11 & b12 & b13 & b14 & 0 & 0 & 0 & + & - & + & - \\ b21 & b22 & b23 & b23 & - & + & + & 0 & + & 0 & - \\ b31 & b32 & b33 & b34 & 0 & + & - & - & 0 & + & 0 \end{array}\right]$$

where in B $$\begin{bmatrix} b11 & b12 & b13 & b14 \\ b21 & b22 & b23 & b24 \\ b31 & b32 & b33 & b34 \end{bmatrix}$$

is the airplane's original open-loop control matrix, "+" means a positive contribution of undetermined value, and "−" means a negative contribution of undetermined value.

As will be readily appreciated by persons skilled in the relevant art(s), closed-loop flight control can be designed based on the above set of equations using various flight control methodologies including classical control, optimal control, non-linear control, on-off control, etc.

Example 2: Application of Flight Control Thrusters to a Rotorcraft UAV

Figure 5:
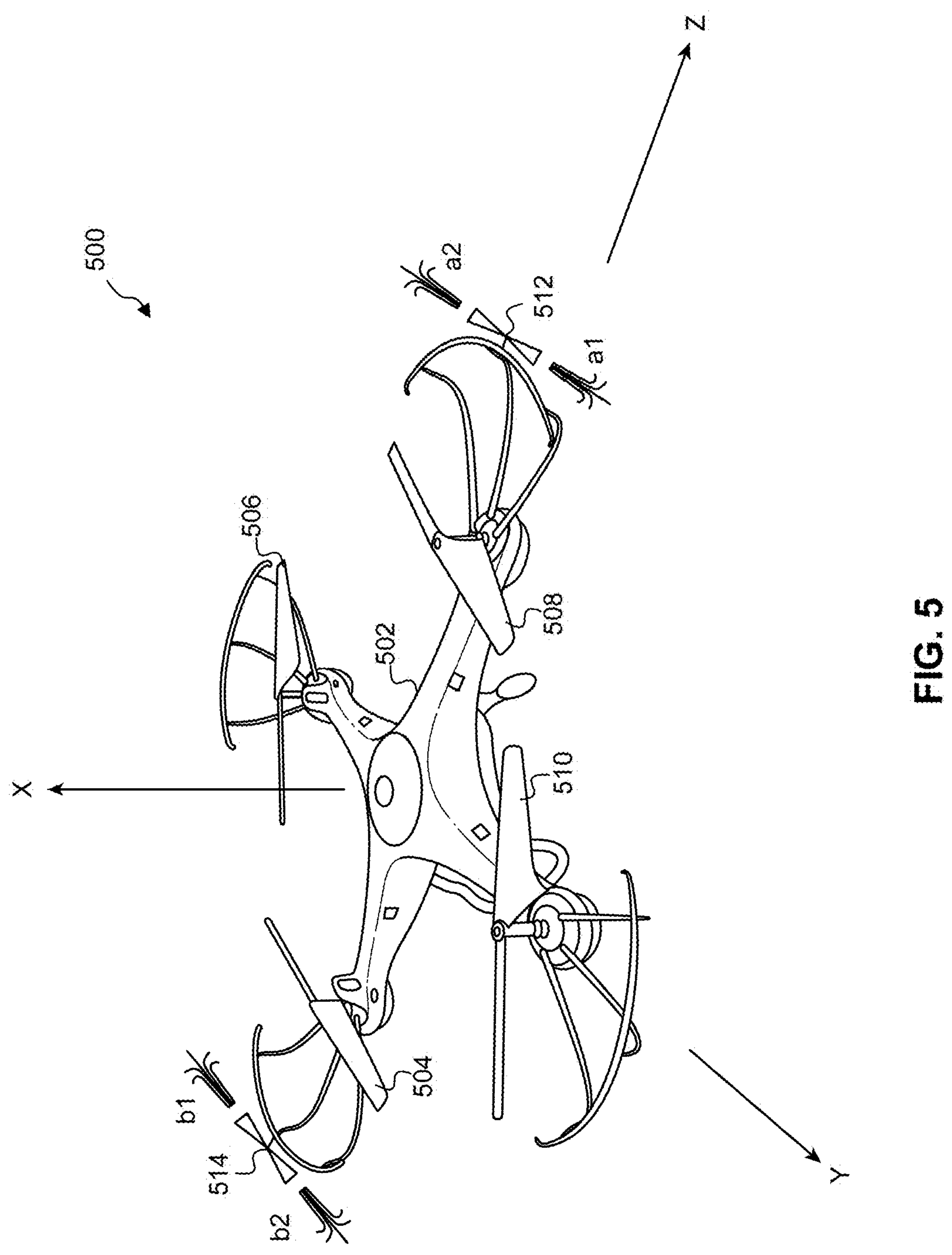
FIG. 5 is a perspective view of a rotorcraft UAV that includes two bidirectional flight control thrusters for enhanced linear motion and attitude control performance during flight.

FIG. 5 depicts an example of a rotorcraft UAV 500 that includes two bidirectional flight control thrusters for enhanced linear motion and attitude control performance during flight. In particular, as shown in FIG. 5, UAV 500 is a quadcopter that comprises an airframe 502 to which are attached four rotors 504, 506, 508, 510, a first bidirectional thruster 512, and a second bidirectional thruster 514. Each of bidirectional thruster 512 and 514 is able to produce thrust in opposite directions. In particular, bidirectional thruster 512 is able to produce thrusts "a1" and "a2", wherein the direction of "a1" is opposite to the direction of "a2". Likewise, bidirectional thruster 514 is able to produce thrusts "b1" and "b2", wherein the direction of "b1" is opposite to the direction of "b2". It is assumed in this configuration that bidirectional thrusters 512 and 514 and the center of gravity of UAV 500 are co-planar. FIG. 5 also depicts a reference coordinate (X, Y, Z) frame By utilizing bidirectional thrusters 512 and 514, UAV 500 can achieve motions that are impossible otherwise. For example, with this configuration, the use of bidirectional thrusters 512 and 514 enables lateral motions that are instantaneous and without tilting of airframe 502.

With this illustrated aircraft configuration and coordinate axes definition, the open-loop system dynamic equations are outlined below.

Linear Motion Control for Example UAV 500.

In this example design of UAV 500, the combination of bidirectional thrusters 512 and 514 can produce pure translation forces in the Y direction. In particular, simultaneous firing of thrusts a2 and b1 will produce a lateral force in the +Y direction, while simultaneous firing of thrusts a1 and b2 will produce a lateral force in the −Y direction.

Thus, for lateral motion control, the open-loop dynamic characteristic can be described as follows.

$$x = [Y, v_y]',$$

where x are system dynamic states, $$u = [\mathrm{Rotor}_1, \mathrm{Rotor}_2, \mathrm{Rotor}_3, \mathrm{Rotor}_4, a_1, a_2, b_1, b_2]',$$

where u is the control distribution matrix, $$\dot{x} = A \cdot x + B \cdot u$$

$$A = \begin{bmatrix} 0 & 0 \\ 0 & 1 \end{bmatrix},$$

$$B = \left[\begin{array}{cccc|cccc} 0 & 0 & 0 & 0 & 0 & 0 & 0 & 0 \\ b1 & b2 & b3 & b4 & - & + & + & - \end{array}\right]$$

where in B $$\begin{bmatrix} b11 & b12 & b13 & b14 \\ b21 & b22 & b23 & b24 \end{bmatrix}$$

is the quadcopter's original open-loop control matrix, "+" means a positive contribution of undetermined value (specific values are functions of aircraft dimensions and strength of flight control thrusts), and "−" means a negative contribution of undetermined value (specific values are functions of aircraft dimensions and strength of flight control thrusts).

It is noted that bidirectional thrusters 512 and 514 can control motion of UAV 500 in both lateral directions given the symmetric nature of a quadcopter. This can be accomplished by making a quick 90° yaw rotation around the X-axis before firing the thrusters. In an alternative embodiment, a similar set of bidirectional thrusters may be installed on the other two rotors to produce lateral forces in the Z-axis co-existent with the Y-axis.

As will be readily appreciated by persons skilled in the relevant art(s), closed-loop flight control can be designed based on the above set of equations using various flight control methodologies including classical control, optimal control, non-linear control, on-off control, etc.

Attitude Control for Example UAV 500.

Bidirectional thrusters 512 and 514 of example UAV 500 can provide effective and instantaneous yaw motion around the X-axis. Firing a1 and b1 together produces a positive moment around the X-axis to produce immediate positive yaw motion. Alternatively, firing a2 and b2 together produces a negative moment around the X-axis to produce immediate negative yaw motion.

Thus, for attitude control formulation, the open-loop dynamic characteristic can be described as follows.

$$x = [\psi, r]',$$

where x are system dynamic states, $$u = [\text{Rotor}_1, \text{Rotor}_2, \text{Rotor}_3, \text{Rotor}_4, a_1, a_2, b_1, b_2]',$$

where u is the control distribution matrix, $$\dot{x} = A \cdot x + B \cdot u$$

$$A = \begin{bmatrix} 0 & 0 \\ 0 & 1 \end{bmatrix},$$

$$B = \left[\begin{array}{cccc|cccc} 0 & 0 & 0 & 0 & 0 & 0 & 0 & 0 \\ b1 & b2 & b3 & b4 & + & + & - & - \end{array}\right]$$

where in B $$\begin{bmatrix} b11 & b12 & b13 & b14 \\ b21 & b22 & b23 & b24 \end{bmatrix}$$

is the quadcopter's original open-loop control matrix, "+" means a positive contribution of undetermined value (specific values are functions of aircraft dimensions and strength of flight control thrusts), and "–" means a negative contribution of undetermined value (specific values are functions of aircraft dimensions and strength of flight control thrusts).

As will be readily appreciated by persons skilled in the relevant art(s), closed-loop flight control can be designed based on the above set of equations using various flight control methodologies including classical control, optimal control, non-linear control, on-off control, etc.

Example 3: Application of Flight Control Thrusters to a Compound UAV

Figure 6:
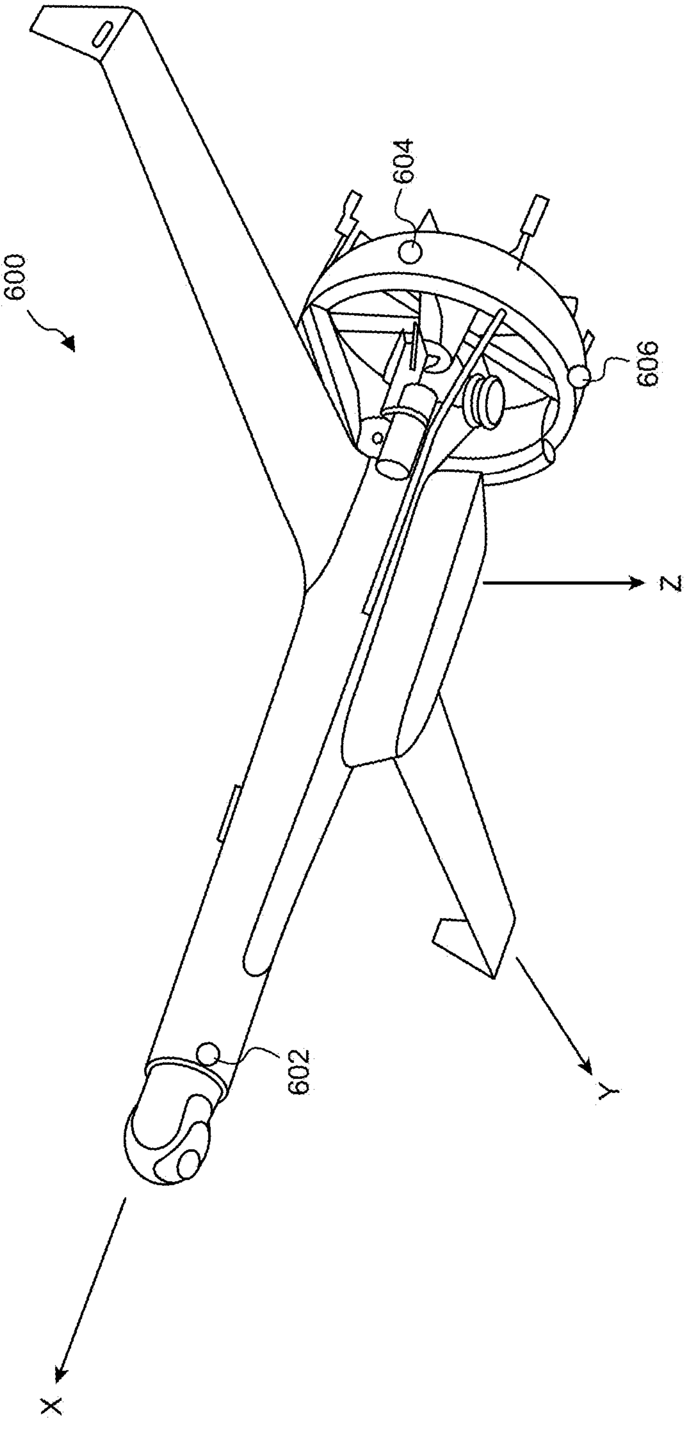
FIG. 6 is a perspective view of a compound UAV that includes three nose thrusters and four tail thrusters for enhanced linear motion and attitude control performance during flight in accordance with an example embodiment.

Flight control thrusters are applicable to all types of aircraft including fixed wing aircraft, rotorcraft aircraft, and compound aircraft that can transfer between rotorcraft and fixed-wing operational modes. FIG. 6 depicts an example of a compound UAV 600 that includes nose and tail thrusters for enhanced linear motion and attitude control performance during flight. In this example, the proposed nose and tail flight control thrusters are of the same configuration as ones illustrated in the example embodiment shown in FIGS. 1-4. In particular, UAV 600 includes three nose thrusters (only one of which, nose thruster 602, is visible in FIG. 6) and four tail thrusters (only two of which, tail thrusters 604 and 606, are visible in FIG. 6) and these nose thrusters and tail thrusters are configured to generate thrusts in a similar manner to the nose thrusters and tail thrusters of UAV 100 as previously described.

The open-loop system dynamic equations of compound UAV 600 is of the same exact structure as those detailed above for fixed-wing missile-like UAV 100. However, as will be readily appreciated by persons skilled in the relevant art(s), exact parameter values in the system equation will be of different values, dependent on particular aircraft physical characteristics.

Figure 7:
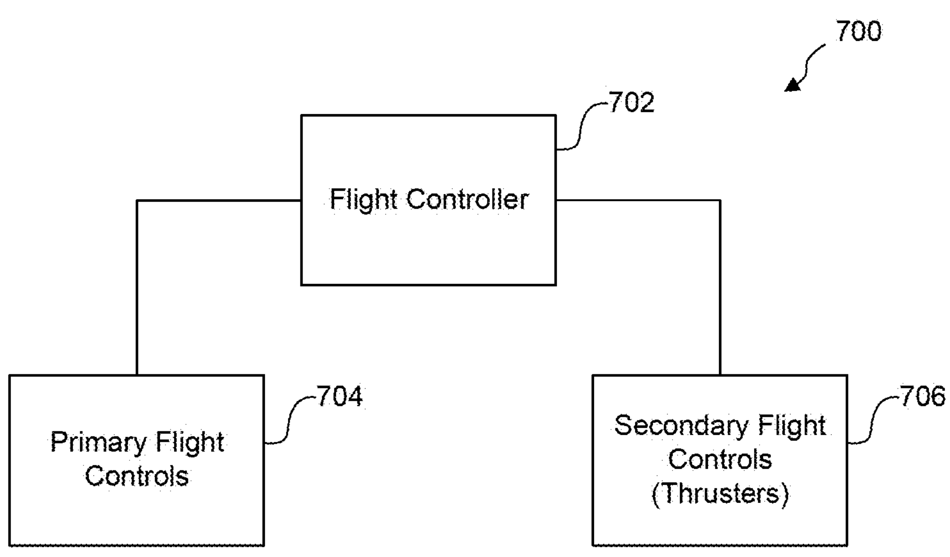
FIG. 7 is a block diagram of a flight control system of a UAV in accordance with an example embodiment.

FIG. 7 is a block diagram of an example flight control system 700 of a UAV in accordance with an embodiment. Flight control system 700 may be implemented in any of a wide variety of UAV types. For example and without limitation, flight control system 700 may be implemented in a fixed-wing UAV such as UAV 100, a rotorcraft UAV such as UAV 500, or a compound UAV such as UAV 600.

As shown in FIG. 7, flight control system 700 includes a flight controller 702 that is housed within an airframe of the UAV, a set of primary flight controls 704 that is connected to the airframe of the UAV, and a set of secondary flight controls 706 that is connected to the airframe of the UAV.

Flight controller 702 is connected to and configured to operate both the set of primary flight controls 704 and the set of secondary flight control 706. In an example embodiment in which flight controller 702 is designed using a MIMO methodology, flight controller 702 may comprise a single flight control design that handles both the set of primary flight controls 704 and the set of secondary flight controls 706 simultaneously. In an example embodiment in which flight controller 702 is designed using a SISO methodology, flight controller 702 may comprise multiple subsystems (or "flight control loops"), each of which operates on individual flight controls, primary or secondary. However, as will be appreciated by persons skilled in the relevant art(s), there exists a multitude of flight control design methodologies that can utilize a thruster-based secondary flight control system. MIMO and SISO are only two examples.

Flight controller 702 may be implemented using one or more general purpose computers, special purpose computers, or other electronic components. Flight controller 702 may include non-transitory computer readable storage media including a set of computer instructions executable by one or more processors to operate both the set of primary flight controls 704 and the set of secondary flight controls 706.

For example, flight controller 702 may include one or more memory storage modules including, but is not limited to, internal storage memory such as random-access memory, non-volatile memory such as read only memory, removable memory such as magnetic storage memory, optical storage, solid-state storage memory or other suitable memory storage entity. Flight controller 702 may be a microprocessor-based system operable to execute program code in the form of machine-executable instructions. In addition, flight controller 702 may be connectable to other devices via a wireless connection, thereby enabling remote control inputs to be provided to flight controller 702.

The set of primary flight controls 704 is operable by flight controller 702 to control an attitude and linear motion of the UAV in three spatial dimensions while the UAV is in flight. The set of secondary flight controls 706 comprises one or more thrusters connected to the airframe and is operable by flight controller 702 to control the attitude of the UAV in one or more of the three spatial dimensions in a speed-independent manner while the UAV is in flight. The set of secondary flight controls 706 is further operable by flight controller 702 to control linear motion of the UAV in one or more of the three spatial dimensions in an axis-independent manner while the UAV is in flight.

In one implementation, the UAV is a missile and the set of primary flight controls 704 comprises one or more of canards, tail flaps, or a tail thrust. For example, with respect to example UAV 100, the set of primary flight controls 704 comprises pivotable tail flaps 104, 106, 108 and 110, and the set of secondary flight controls comprises nose thrusters 112, 114 and 116 and tail thrusters 118, 120, 122 and 124.

In yet another implementation, the UAV is a fixed wing aircraft and the set of primary flight controls 704 comprises one or more of canards, ailerons, an elevator, or a rudder.

In still another implementation, the UAV is a rotorcraft and the set of primary flight controls comprises one or more rotors. For example, with respect to example UAV 500, the set of primary flight controls 704 comprises rotors 504, 506, 508 and 510, and the set of secondary flight controls comprises bidirectional thrusters 512 and 514.

In a further implementation of the UAV, the UAV is a compound aircraft and the set of primary flight controls comprises a combination of fixed wing aircraft flight controls and rotorcraft flight controls. For example, with respect to example UAV 600, the set of primary flight controls 704 comprises both fixed wing aircraft flight controls and rotorcraft flight controls, and the set of secondary flight controls comprises three nose thrusters and four tail thrusters.

In some embodiments, each thruster in the set of secondary flight controls 706 is a fixed thruster. However, in other embodiments, at least one thruster in the set of secondary flight controls 706 is a rotatable thruster. As will be appreciated by persons skilled in the relevant art(s), a rotatable thruster may be used to enable a single thruster to selectively generate thrust in a variety of different directions for the purposes of providing linear motion and/or attitude control of a UAV.

Figure 8:
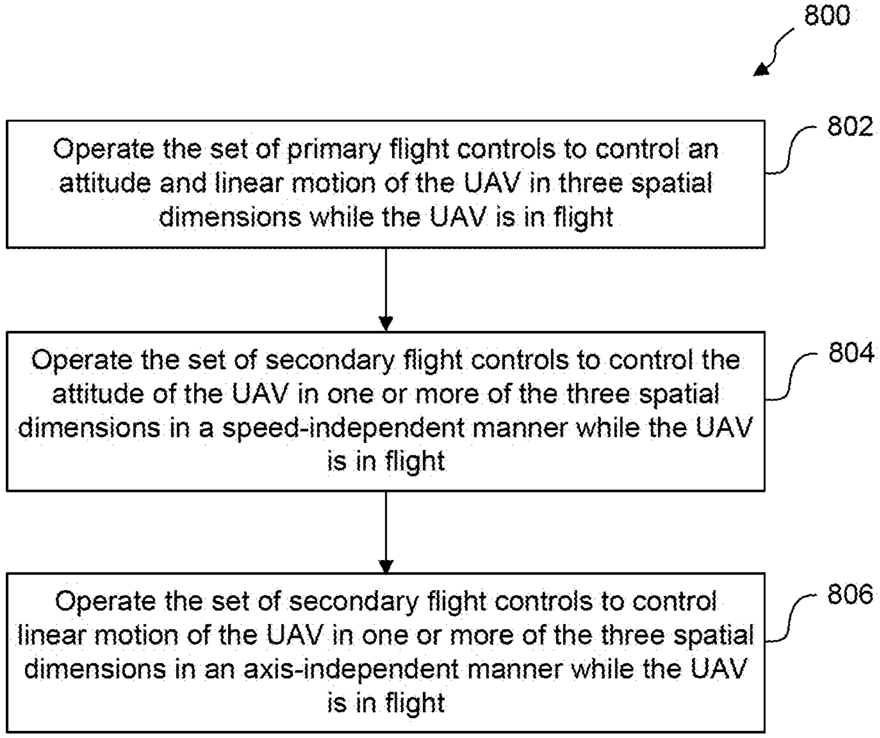
FIG. 8 is a flowchart of a method performed by a flight controller of a UAV in accordance with an example embodiment.

FIG. 8 depicts a flowchart 800 of a method performed by a flight controller of a UAV (such as flight controller 702 of FIG. 7), wherein the UAV comprises an airframe, a set of primary flight controls connected to the airframe (e.g., set of primary flight controls 704 of FIG. 7), and a set of secondary flight controls that comprises one or more thrusters connected to the airframe (e.g., set of secondary flight controls 706 of FIG. 7), and wherein the flight controller is housed in the airframe and is connected to the set of primary flight controls and the set of secondary flight controls.

As shown in FIG. 8, the method of flowchart 800 comprises, at 802, operating the set of primary flight controls to control an attitude and linear motion of the UAV in three spatial dimensions while the UAV is in flight, at 804, operating the set of secondary flight controls to control the attitude of the UAV in one or more of the three spatial dimensions in a speed-independent manner while the UAV is in flight, and at 806, operating the set of secondary flight controls to control linear motion of the UAV in one or more of the three spatial dimensions in an axis-independent manner while the UAV is in flight.

III. Conclusion

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. An unmanned aerial vehicle (UAV), comprising:

an airframe;

a set of primary flight controls connected to the airframe, the set of primary flight controls being operable to control an attitude and linear motion of the UAV in three spatial dimensions throughout the flight envelope of the UAV, wherein the set of primary flight controls comprises a combination of fixed wing aircraft flight controls and rotorcraft flight controls; and a set of secondary flight controls that comprises at least a first set of one or more thrusters connected to a front portion of the airframe and a second set of one or more thrusters connected to a rear portion of the airframe, the set of secondary flight controls being operable to control the attitude and the linear motion of the UAV in any of the three spatial dimensions in a speed-independent manner throughout the flight envelope of the UAV, wherein at least two thrusters of the first set of one or more thrusters or the second set of one or more thrusters are multi-purpose thrusters each being independently configurable in different combinations to generate thrust in different directions and control the attitude and the linear motion of the UAV in any of the three spatial dimensions in the speed-independent manner throughout the flight envelope of the UAV;

wherein the airframe houses a flight controller that is connected to and configured to simultaneously operate the set of primary flight controls and the set of secondary flight controls, and wherein the UAV is a compound aircraft.

2. The UAV of claim 1, wherein the set of secondary flight controls is further operable to control the attitude and the linear motion of the UAV in an axis-independent manner throughout the flight envelope of the UAV.

3. The UAV of claim 1, wherein the airframe further houses a source of thrust for the first set of one or more thrusters and the second set of one or more thrusters, the source of thrust comprising one or more of:

an on-board air compressor;

a high pressure gas reservoir;

a chemical combustion engine; or bleed from a propulsion thrust.

4. The UAV of claim 1, wherein at least one thruster of the first set of one or more thrusters or the second set of one or more thrusters comprises a fixed thruster.

5. The UAV of claim 1, wherein a number of the second set of one or more thrusters is greater than a number of the first set of one or more thrusters.

6. The UAV of claim 1, wherein the first set of one or more thrusters and the second set of one or more thrusters are configured to collectively generate lateral movement of the UAV without rotation of the airframe.

7. The UAV of claim 1, wherein the fixed wing aircraft flight controls comprise one or more of:

canards;

ailerons;

an elevator; or a rudder.

8. The UAV of claim 1, wherein the rotorcraft flight controls comprise one or more rotors.

9. The UAV of claim 1, wherein the rotorcraft flight controls comprise one or more rotors housed in a ring-shaped body, wherein the ring-shaped body is coupled to the airframe, and wherein the second set of one or more thrusters are coupled to the ring-shaped body.

10. The UAV of claim 9, wherein the one or more rotors are configured to control the linear motion of the UAV along the longitudinal axis of the UAV.

11. The UAV of claim 9, wherein the ring-shaped body is coupled to the rear portion of the airframe.

12. A method performed by a flight controller of an unmanned aerial vehicle (UAV) that comprises an airframe, a set of primary flight controls connected to the airframe, and a set of secondary flight controls that comprises at least a first set of one or more thrusters connected to a front portion of the airframe and a second set of one or more thrusters connected to a rear portion of the airframe, wherein at least two thrusters of the first set of one or more thrusters or the second set of one or more thrusters are multi-purpose thrusters, and wherein the flight controller is housed in the airframe and is connected to and configured to simultaneously operate the set of primary flight controls and the set of secondary flight controls, the method comprising:

operating the set of primary flight controls to control an attitude and linear motion of the UAV in three spatial dimensions throughout the flight envelope of the UAV, wherein the set of primary flight controls comprises a combination of fixed wing aircraft flight controls and rotorcraft flight controls; and operating the set of secondary flight controls to control the attitude and the linear motion of the UAV in any of the three spatial dimensions in a speed-independent manner throughout the flight envelope of the UAV, wherein operating the set of secondary flight controls comprises independently configuring each of the multi-purpose thrusters in different combinations to generate thrust in different directions and control the attitude and the linear motion of the UAV in any of the three spatial dimensions in the speed-independent manner throughout the flight envelope of the UAV, and wherein the UAV is a compound aircraft.

13. The method of claim 12, further comprising:

operating the set of secondary flight controls to control the attitude and the linear motion of the UAV in an axis-independent manner throughout the flight envelope of the UAV.

14. The method of claim 12, further comprising:

providing a source of thrust for the first set of one or more thrusters and the second set of one or more thrusters, the source of thrust comprising one or more of:

an on-board air compressor;

a high pressure gas reservoir;

a chemical combustion engine; or bleed from a propulsion thrust.

15. The method of claim 12, wherein the multi-purpose thrusters comprise a combination of a fixed thruster and a rotatable thruster, and wherein operating the set of secondary flight controls comprises:

operating the combination of the one or more of the fixed thruster and the rotatable thruster to control the attitude and the linear motion of the UAV in any of the three spatial dimensions in the speed-independent manner throughout the flight envelope of the UAV.

16. The method of claim 12, further comprising:

controlling lateral movement of the UAV without rotating the airframe based on operation of the first set of one or more thrusters and the second set of one or more thrusters.

17. The method of claim 12, wherein the rotorcraft flight controls comprise one or more rotors housed in a ring-shaped body, and wherein the ring-shaped body is coupled to the airframe, the method further comprising:

operating the one or more rotors to control the linear motion of the UAV along the longitudinal axis of the UAV.

18. The method of claim 12, wherein the fixed wing aircraft flight controls comprise one or more of:

canards;

ailerons;

an elevator; or a rudder, and wherein operating the set of primary flight controls comprises operating one or more of the canards, the ailerons, the elevator, or the rudder to control the attitude and the linear motion of the UAV in the three spatial dimensions throughout the flight envelope of the UAV.

19. The method of claim 17, wherein the second set of one or more thrusters are coupled to the ring-shaped body, and wherein operating the set of secondary flight controls comprises:

operating the second set of one or more thrusters to control the attitude and the linear motion of the UAV in any of the three spatial dimensions in the speed-independent manner throughout the flight envelope of the UAV.

20. The method of claim 17, wherein the ring-shaped body is coupled to the rear portion of the airframe.

* * * * *